United States Patent
Gates et al.

(10) Patent No.: US 9,356,939 B1
(45) Date of Patent: May 31, 2016

(54) SYSTEM AND METHOD FOR DYNAMIC ACCESS CONTROL BASED ON INDIVIDUAL AND COMMUNITY USAGE PATTERNS

(71) Applicants: Carrie E. Gates, Dublin, CA (US); Timothy Gorden Brown, Fort Edward, NY (US); Anil Somayaji, Ottawa (CA); Yiru Li, Ithaca, NY (US)

(72) Inventors: Carrie E. Gates, Dublin, CA (US); Timothy Gorden Brown, Fort Edward, NY (US); Anil Somayaji, Ottawa (CA); Yiru Li, Ithaca, NY (US)

(73) Assignee: CA, Inc., New York, NY (US)

( * ) Notice: Subject to any disclaimer, the term of this patent is extended or adjusted under 35 U.S.C. 154(b) by 356 days.

(21) Appl. No.: 13/830,607

(22) Filed: Mar. 14, 2013

(51) Int. Cl.
*G06F 7/04* (2006.01)
*H04L 29/06* (2006.01)

(52) U.S. Cl.
CPC ................................. *H04L 63/104* (2013.01)

(58) Field of Classification Search
CPC .................................................. H04L 63/104
USPC ........................................................ 726/3
See application file for complete search history.

(56) References Cited

U.S. PATENT DOCUMENTS

| | | | |
|---|---|---|---|
| 2006/0294598 A1* | 12/2006 | Lam et al. | 726/28 |
| 2007/0272744 A1 | 11/2007 | Bantwal et al. | |
| 2009/0099895 A1* | 4/2009 | Carrier et al. | 705/9 |
| 2009/0234684 A1* | 9/2009 | Stoke et al. | 705/7 |
| 2011/0307957 A1* | 12/2011 | Barcelo et al. | 726/25 |
| 2014/0189270 A1* | 7/2014 | Iwanicki | G06F 17/30159 711/162 |
| 2014/0380484 A1* | 12/2014 | Choi et al. | 726/25 |

* cited by examiner

*Primary Examiner* — Kambiz Zand
*Assistant Examiner* — Aubrey Wyszynski
(74) *Attorney, Agent, or Firm* — Baker Botts L.L.P.

(57) ABSTRACT

Systems and methods include receiving data corresponding to a request to access a resource by an identity provided with authority to access the resource. Systems and methods include determining whether the identity is a member of a community based on associating data. The community includes identities as members thereof. Systems and methods include determining a risk level associated with the request. The risk level is determined using a history of access of the resource by a particular member the community if the identity is a member of the community. The risk level is determined using a history of access of the resource by the identity if the identity is not a member of the community. Systems and methods include determining an access policy based on the risk level associated with the request. The access policy indicates whether access to the resource by the identity is to be restricted.

20 Claims, 6 Drawing Sheets

SYSTEM AND METHOD FOR DYNAMIC ACCESS CONTROL BASED ON INDIVIDUAL AND COMMUNITY USAGE PATTERNS

BACKGROUND

The present disclosure relates to identity and access management and, more specifically, to a system and method for dynamic access control based on individual and community usage patterns.

In known access control systems, each identity is assigned a role or becomes a member with a role. An identity is granted access to a resource based on the identity's role.

BRIEF SUMMARY

According to an aspect of the present disclosure, a method may include receiving, at a receiving device, data corresponding to a request to access a resource by a particular identity provided with authority to access the resource. The method may include determining, by a determination device, whether the particular identity is a member of a community based on associating data that associates the particular identity with the community. The community may include a plurality of identities as members thereof that are associated based on the associating data. The method may include determining, by an analysis device, a risk level associated with the request. The risk level may be determined using a history of access of the resource by a particular member of the community if the particular identity is a member of the community. The risk level may be determined using a history of access of the resource by the particular identity if the particular identity is not a member of the community. The method may include determining, by an access device, an access policy based on the risk level associated with the request. The access policy may indicate whether access to the resource by the particular identity is to be restricted. Systems and computer program products for implementing the method are disclosed herein.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
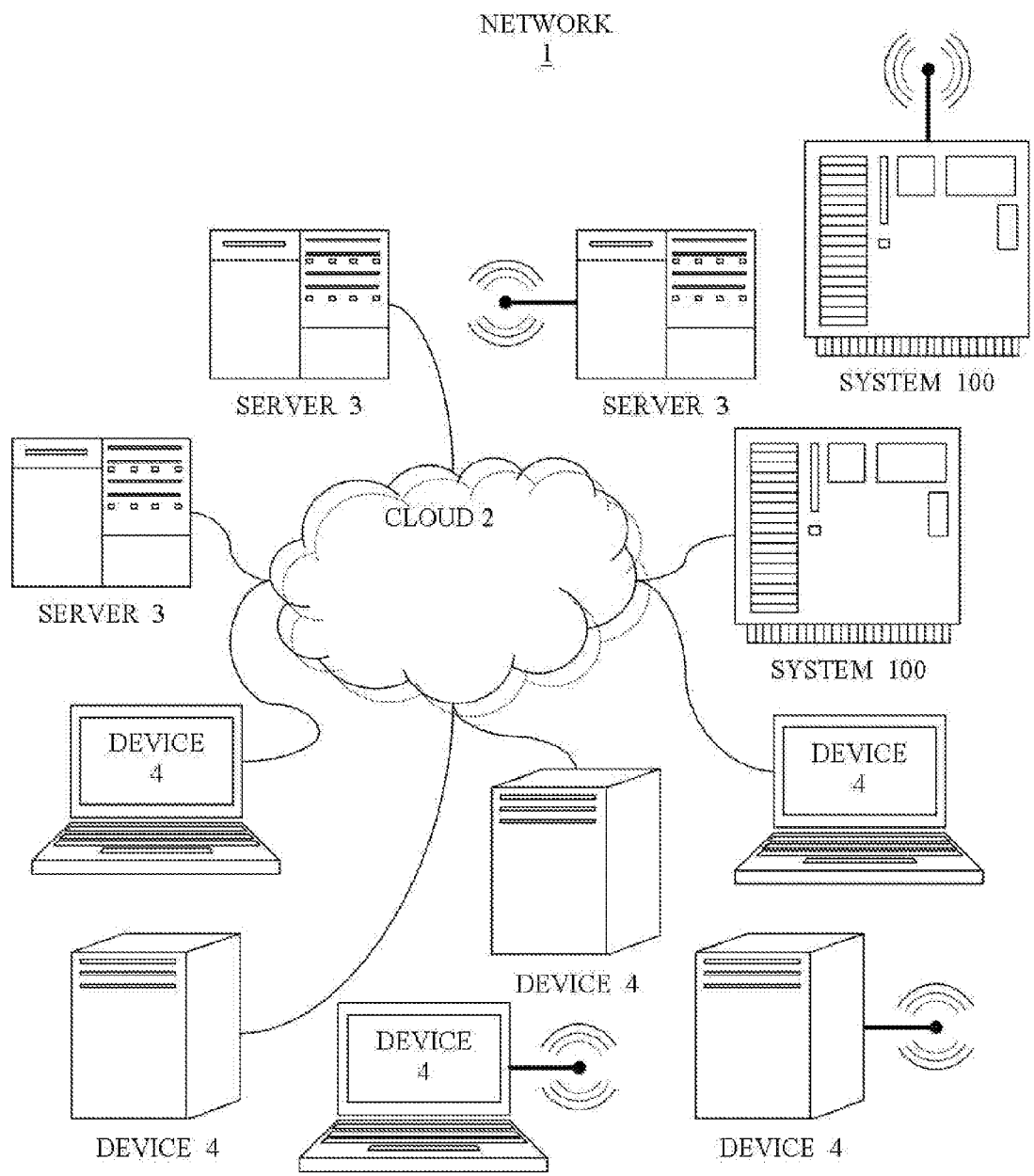
FIG. 1 is a schematic representation of a network 1 on which systems and methods for dynamic access control may be implemented.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN®2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to security management, and more specifically to identity and access management, as related to IT service and asset management in cloud computing, systems and methods disclosed herein may also be related to other areas beyond cloud computing. Systems and methods disclosed herein may be applicable to a broad range of applications that require access by an array of identities and that are associated with various disciplines, such as, for example, research activities (e.g., research and design, development, collaboration), commercial activities (e.g., sales, advertising, financial evaluation and modeling, inventory control), IT systems (e.g., establishing access privileges for computing systems, establishing user rights and roles, document management, resource-management, cloud computing, network access, security, service provisioning), and other activities of importance to a user or organization. In some configurations, systems and methods disclosed herein may even be related to physical access systems (e.g., door locks, lockboxes, safes).

Substantial efforts have been made to streamline the process of granting access to resources and to create roles (e.g., designations, positions within a company, certification levels, status on a team) that fit business needs. Such efforts may have worked fairly well, but these efforts may still result in particular identities (e.g., users, employees, customers, contractors, computer systems, business entities, government entities) having too much access. Having inappropriate or too much access may be one of the major security issues within an organization. Modifying the role environment may not be practical and may result in unanticipated results. Having finer grained access control via roles may create a complex and difficult to manage environment. To address these and other problems, a dynamic access control system that leverages the activity patterns of colleagues and collaborators now is disclosed herein.

A system disclosed herein may utilize user activity, usage patterns, and community models to determine if a user should receive access to a specific resource at a particular point in time. A non-limiting, example scenario now is described. A secretary may be sitting in front of a file cabinet. A group of people may come up and ask the secretary for a folder. The secretary may give the folder to one or more of the people based on her knowledge of the folder and the one or more people. When a new person comes up and asks for the folder, that new person may have the rights to the folder (e.g., the new person may be authorized to access the resource), but the new person's request for the folder may be out of the ordinary (e.g., anomalous, outside the scope of past experience, unexpected). The secretary may not know whether to give the folder to the new person. In some cases, the secretary may telephone someone and confirm that the new person should have the folder, or the secretary may note down the activity.

Consequently, the secretary may perform the following logic process. The secretary may determine if a person requesting the folder is recognized (e.g., known, familiar) and has accessed the file before. If the person has not accessed the file before, the secretary may determine if the person collaborates with others and if the others, with whom the person collaborates, are recognized. If the secretary recognizes others, with whom the identity collaborates, the secretary may determine if one or more of the others has accessed the folder. Thus, if all, or some portion of, the others have accessed the folder, it may be okay to give the folder to the person.

The non-limiting, example scenario described above may also occur in a software environment, which now is described in another non-limiting, example. The Chief Architect for an engineering company may have rights to all the software in a company (e.g., the Chief Architect may be authorized to access all the software in the company), but, in many cases, the Chief Architect may not download the code or build the products. If the Chief Architect downloads the code, such action may be treated as an anomaly and may be audited, logged, and, possibly, stopped. To implement such security-related actions (e.g., auditing, logging, prohibiting access, restricting access), software may need to understand and implement logic similar to that used by the secretary in the prior example. Consequently, the software, like the secretary, may instruct a device to determine if an identity (e.g., person, device, system, IP address, MAC address, username, account, profile) is recognized (e.g., known, familiar) and subsequently to determine if the identity has accessed the file before. In certain configurations, the identity may have authority to access the resource (e.g., the identity may be authorized to access the resource) based on one or more of the identity's role, position, designation, assignment to a project or team, department, seniority, or another factor. If the identity has not accessed the file before, the software may instruct the device to determine if the identity collaborates with others and if the others, with whom the identity collaborates, are recognized. If the others, with whom the identity collaborates, are recognized, the software may instruct the device to determine if one or more of the others has accessed the file. Thus, if all, or some portion of, the others have accessed the file, it may be okay to allow the identity to access the file.

Accordingly, such processes may be implemented by a processor executing computer-readable instructions or similar configurations, as disclosed herein. In particular configurations, the processor or equivalent device may function as a plurality of components, comprising a learning component, an analysis component (e.g., a risk analysis component), and an enforcement component.

The learning component may comprise an identity history function (e.g., a function for obtaining a history of activity performed by one or more identities) and a community determination function (e.g., a determination of community process for determining if two or more identities together form a community).

History of Identity Activity. In particular configurations, information about each resource access by each identity may be logged and maintained in a memory. Accordingly, a history of identity activity for each identity may be generated. The history of identity activity may provide a baseline to work from and to perform analysis. The history of identity activity may comprise a history of access of one or more resources by the identity. In some configurations, the history of access of the one or more resources by the identity may indicate that the identity has not accessed one or more of the one or more resources (e.g., information explicitly indicating that a particular resource has not been accessed by the identity; no information indicating that the identity has accessed a particular resource, which may implicitly indicate that the identity has not accessed the particular resource).

In some configurations, an aging function may be applied to one or more histories of identity activity, and expired information (e.g., older information, stale information, non-recent information, non-current information, information recorded outside of a predetermined period of time or prior to a particular date or time, information related to access events that occurred outside of a predetermined period of time or prior to a particular date or time, information about the identity that is no longer current) may be updated or removed from the history of identity activity. In certain configurations, the aging function may remove a resource from an access list for a particular identity if the particular identity or another identity associated with (e.g., in a same community with) the particular identity has not accessed the resource within a specified period of time. In some configurations, such an aging function or a similar function may be performed as part of one or more of the learning component (e.g., as part of one or more of the identity history function and the community determination function), the analysis component, and the enforcement component.

Determination of Community. A community may comprise at least two identities that are collaborating towards some specific goal (e.g., a project team, a set of people that are working together and access common resources, a business division or department, a particular group). A particular identity may be a member of a plurality of communities. A community may be determined based on one or more factors, such as, for example, static roles, groups, resource usage, and email patterns. The learning component may determine who actually works with whom (e.g., identify a project team) by analyzing historical access logs (e.g., one or more histories of identity activity). The aging function may remove an identity from a community when the identity is no longer collaborating with identities associated with the community (e.g., the identity is not collaborating with any identity associated with the community, the identity is not collaborating with one or more specific identities associated with the community, the identity is not collaborating with a specified number of identities associated with the community, the identity is not collaborating with all of the identities associated with the community, the identity is not collaborating with the identities associated with the community with sufficient frequency or duration). The communities may be a key component of the systems and methods disclosed herein. In particular, the communities may limit the number of false positives (e.g., granting access when such access is high risk, undesirable, or improper, denying access when such access is low risk, beneficial, and proper) and allow for flexibility in the analysis and determination of an access policy or access rights (e.g., a policy or rights indicating whether access to a resource by one or more identities is to be restricted). In certain configurations, the access policy may indicate that access to a resource is to be fully restricted (e.g., one or more identities may not access the resource in any manner).

In particular configurations, the analysis component may determine if access to a resource (e.g., a file, an application, a document, a location, a folder, information, an account, a device, a service) or use of the resource by an identity is anomalous (e.g., outside the scope of normal behavior, unexpected, unusual), such as, for example, when an identity requesting a resource has never accessed the resource before and no identity within a community, of which the identity is a member (e.g., the identity is associated with the community), has accessed the resource. The analysis component may take into account the history of the identity and the history of the identity's community to determine a degree of risk (e.g., risk level) associated with the identity accessing the resource. Further, the analysis component may take into account one or more of a sensitivity and an importance of the resource when determining the degree of risk associated with the identity accessing the resource. The history of the identity's community may comprise a history of access of one or more resources by one or more members of the community. In some configurations, the history of access of the one or more resources by the one or more members of the community may indicate that the one or more members of the community has not accessed one or more of the one or more resources (e.g., information explicitly indicating that a particular resource has not been accessed by the one or more members of the community; information explicitly indicating that a particular resource has not been accessed by any member of the community; no information indicating that the one or more members of the community has accessed a particular resource, which may implicitly indicate that the one or more members of the community has not accessed the particular resource; no information indicating that any member of the community has accessed a particular resource, which may implicitly indicate that no member of the community has accessed the particular resource).

In particular configurations, the enforcement component may utilize information from the analysis component to determine if the identity should have access to the resource and if such access to the resource should have one or more restrictions placed thereupon. The enforcement component may contain the policy based on one or more of the importance and sensitivity of the resource. In certain configurations or for some resources, the access policy may be very specific. For example, the policy may require additional verification steps if an identity has never accessed the resource, even if another identity from the community has accessed the resource. In some configurations, the analysis component may take into account such verification information (e.g., verification data) when determining the degree of risk associated with the identity accessing the resource. In some configurations, the access policy may grant the identity access, either full or restricted, to the resource if people in the identity's community have previously accessed the resource before. In many configurations, the access of the resource by the identity may be audited, and, in some configurations, such access may be suspended or prohibited in the future.

Existing access control models utilize static roles and groups, and existing access control systems often utilize a risk analysis component. Nevertheless, existing systems may not take into account a history of access and a community model to determine level of risk associated with access in a manner similar to that of the systems and methods disclosed herein.

The systems and methods disclosed herein provide many unique advantages. In particular configurations of the systems and methods disclosed herein, it may be possible to add an additional level of security to an environment without changing the base role model. Moreover, even if configured for use as an audit tool, without an enforcement component, the systems and methods disclosed herein may allow for the identification of potentially malicious activity without effecting the performance of the environment. The systems and methods disclosed herein also may allow for generation and analysis of real usage patterns that may be utilized to create an accurate or improved role model, which may be utilized to more effectively assign static access rights.

Referring now to FIG. 1, a network 1 comprising a plurality of resources now is disclosed. Network 1 may comprise one or more clouds 2, which may be public clouds, private clouds, or community clouds. Each cloud 2 may permit the exchange of information, services, and other resources between various identities that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications between identities and may permit identities to access various resources of network 1.

Network 1 may comprise one or more servers 3 that may at least store resources thereon, host resources thereon, or otherwise make resources available for certain identities. Such resources may comprise, but are not limited to, information technology services, financial services, business services, access services, other resource-provisioning services, secured files and information, unsecured files and information, accounts, and other resources desired by one or more entities. In some configurations, for example, one or more server 3 may even provide a service of granting access to a particular location (e.g., functioning as a lock or other physical access-restricting mechanism). More generally, servers 3 may comprise, for example, one or more of general purpose computing devices, specialized computing devices, mainframe devices, wired devices, wireless devices, and other devices configured to provide resources to consumers.

Network 1 may comprise one or more devices 4, which may enable certain identities to access certain resources via one or more servers 3, which, in some configurations, may connect to the one or more devices 4 via cloud 2 or via other network routes. Devices 4 may comprise, for example, one or more of general purpose computing devices, specialized computing devices, mobile devices, wired devices, wireless devices, passive devices, routers, switches, and other devices utilized by consumers of provided services. In certain configurations, a device 4 may be configured to perform the same functions as a server 3 in addition to the functions of a device 4 set forth above, a server 3 may be configured to perform the same functions as a device 4 in addition to the functions of a server 3 set forth above, and it may not be necessary to access resources via network 1 or cloud 2 (e.g., a system comprising an input device, such as a keyboard or mouse, performing the functionality of device 3 and a general purpose computer performing the functionality of server 4).

Moreover, network 1 may comprise one or more system 100 that may monitor requests to access resources (e.g., a request from a device 3 to access a resource via a server 4) and may collect information about resource access. In certain configurations, such information may comprise, for example, one or more of information about an identity requesting access to or accessing a resource, time or date information associated with accessing or requesting access to the resource, frequency information associated with accessing or requesting access to the resource, a quantity of requests to access the resource, a number of times the resource has been accessed, a number of times access to the resource has been prohibited or restricted or a frequency thereof, information about the resource such as importance or sensitivity. In this manner, system 100 may function as the learning component described above. Further, system 100 may also function as the analysis component, as described above, and determine a degree of risk associated with one or more of the request to access the resource by the identity and the identity itself. Moreover, in certain configurations, system 100 may function as an enforcement device, as described above, and determine an access policy for the identity to access the resource. In some configurations, system 100 may provide the access policy to server 3, such that server 3 may enforce the access policy. In other configurations, system 100 may enforce the access policy itself. System 100 may be, for example, one or more of a general purpose computing device, a specialized computing device, a wired device, a wireless device, and any other device configured monitor and analyze information.

System 100 may connect to cloud 2 and monitor servers 3 and devices 4. By monitoring servers 3 and devices 4, system 100 may generate rich datasets regarding many identities, many resources, and the utilization and access of such resources. System 100 may utilize these data sets to analyze requests for access to resources by identities, and may generate access policies for the identities to access the resources via the cloud, other networks, or other means. In this manner, system 100 may provide dynamic access control based on individual and community usage patterns.

In some configurations, one or more of a server 3 and a device 4 may comprise system 100. Accordingly, system 100 may be an integral component of the one or more of server 3 and device 4 and may connect directly thereto, rather than via cloud 2 or another network connection. In other configurations, system 100 may be separate from servers 3 and devices 4.

Figure 2:
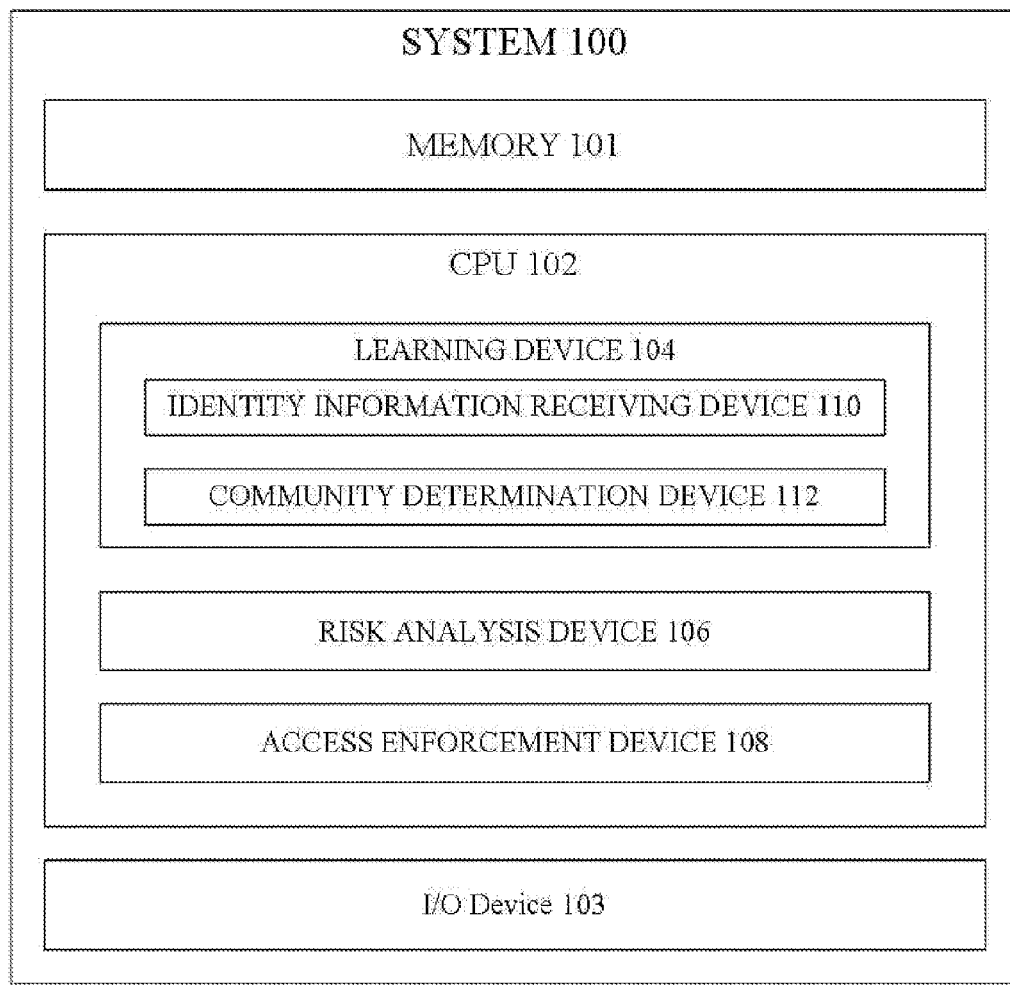
FIG. 2 is a schematic representation of a system configured to provide dynamic access control based on individual and community usage patterns.

Referring now to FIG. 2, system 100, which may monitor requests for access to one or more resources and provide dynamic access control based on individual and community usage patterns, now is described. System 100 may comprise a memory 101, a CPU 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more of a learning device 104, a risk analysis device 106, and an access enforcement device 108. More specifically, CPU 102 may operate as one or more of an identity information receiving device 110 and a community determination device 112 when the computer-readable instructions stored in memory 101 instruct CPU 102 to operate as learning device 104. In particular configurations, learning device 104, risk analysis device 106, and access enforcement device 108 may be implemented on different CPUs. In some configurations, system 100 may not comprise one or more of learning device 104, risk analysis device 106, and access enforcement device 108. I/O device 103 may transmit data to cloud 2, may transmit data to other devices connected to system 100, and may transmit a notification (e.g., display a message, make a sound, send an email, make a telephone call) to a user (e.g., an identity). Further, I/O device 103 may implement one or more of wireless and wired communication between system 100 and other devices.

Figure 3:
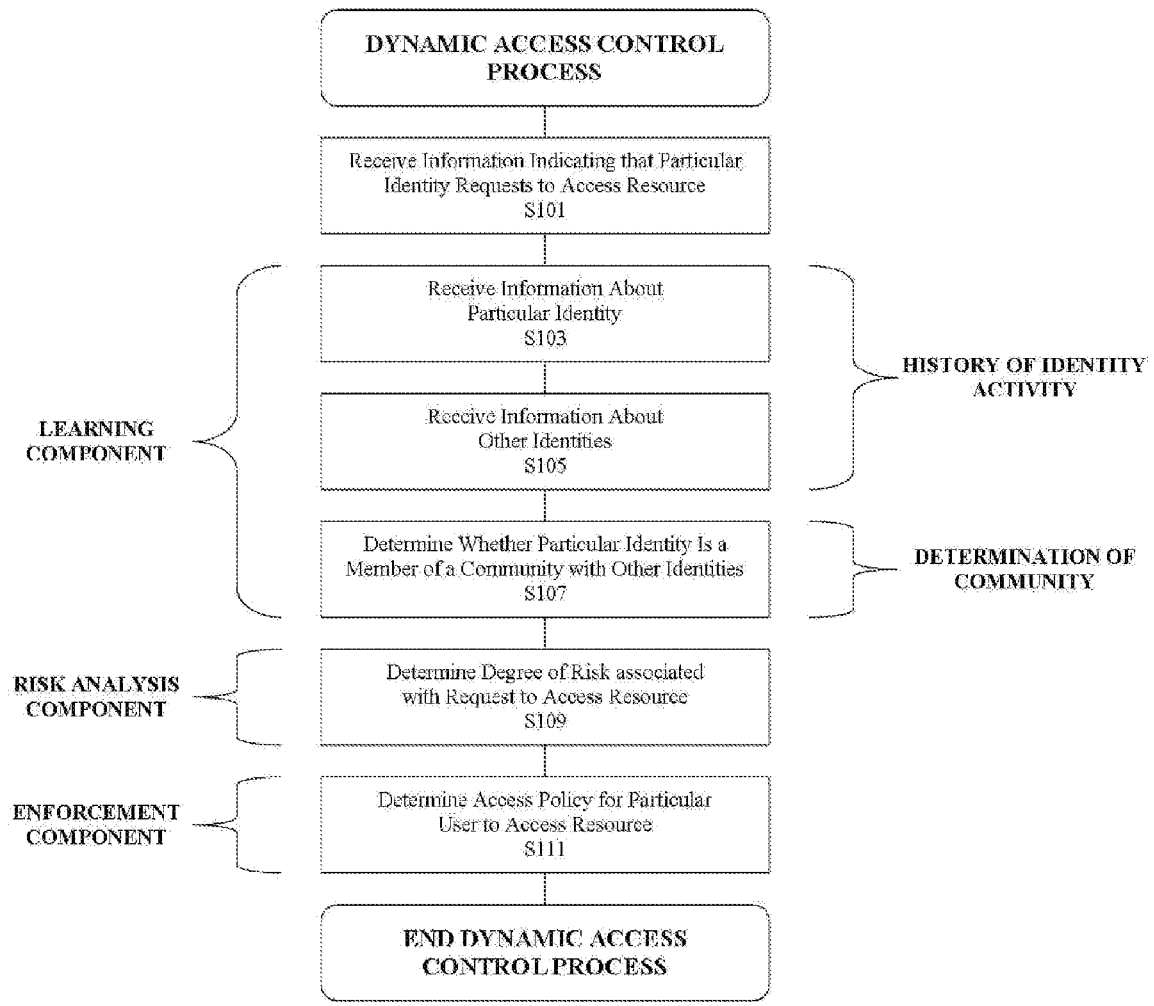
FIG. 3 illustrates a dynamic access control process.

Referring now to FIG. 3, a dynamic access control process now is described. In S101, CPU 102 may receive information (e.g., request information) indicating that a particular identity is requesting access to a resource. Such request information may comprise, for example, one or more of a time of the request, a date of the request, a type of the request, information identifying the particular identity making the request (e.g., one or more of name, account number, account name, username, IP address, telephone number, location, demographic information, status, affiliations of the identity, title, role), and information identifying the resource. CPU 102 may store such request information in a log file in memory 101 or in another location (e.g., in a data server, in another memory, in a device providing or hosting the resource, in a device that generates the request). In some configurations, for example, system 100 may receive the request directly and may determine such request information therefrom. In other configurations, system 100 may receive a packet containing such request information from another device (e.g., a server 3, a device 4) that has either received or transmitted the request. In certain configurations, learning device 104 may perform the function of receiving such request information and storing such request information in memory 101 or the other location.

In S103, identity information receiving device 104 (e.g., a receiving device) may receive information (e.g., identity information) about the particular identity that made the request to access the resource. In certain configurations, for example, in response to receiving the request information in CPU 102, identity information receiving device 104 may request and receive the identity information from memory 101. In other configurations, identity information receiving device 104 may request and receive the identity information from another location (e.g., a data server, another memory, a device providing or hosting the resource, a request-generating device). In some configurations, identity information receiving device 104 may request and receive portions of identity information from both memory 101 and one or more other locations and may compile the identity information from such portions of identity data. By compiling portions of identity data from a plurality of sources, the depth and richness of the identity data may be improved.

Identity information may comprise access information, which may comprise, for example, one or more of information about which resources the particular identity has previously accessed, one or more of time and date information indicating when and for how long the particular identity accessed each such resource, information indicating how frequently the particular identity accessed each of such resource, request information associated with each request for each such resource by the particular identity, information about requests to access resources by the particular identity that were denied or restricted, and other information related to the particular identity requesting access to or accessing a resource. Further, identity information may comprise social information (e.g., associating data that may associate an identity to a community), which may comprise, for example, one or more of information about past communications (e.g., emails, telephone calls, messaging service communications, posts, visits, tweets, internet posts) between the particular identity and other identities; information about one or more of the particular identity's position, role, employment status, access rights, team assignments, project assignments, clearance; and other information that may indicate an association or collaboration with one or more other identity. The identity information may be collected by one or more devices (e.g., systems 100, servers 3, devices 4) that may monitor for requests to access resources and access events in which resources are accessed. Consequently, the identity information may provide a social profile or timeline for the particular identity that may be correlated with the access information.

In S105, identity information receiving device 104 may receive identity information corresponding to one or more other identities. Similar to the identity information corresponding to the particular identity, the identity information receiving device 104 may request and receive the identity information corresponding to the one or more other identities from memory 101, one or more other location, or memory 101 and one or more other location, depending on a configuration thereof. The identity information corresponding to the one or more other identities may be compiled, as appropriate. S103 and S105 may be performed in any order thereof and may even be performed simultaneously. Consequently, processes S103 and S105 may determine a history of identity activity.

The one or more other identities may be selected in many ways. For example, the one or more other identities may be identities that work for the same company, that work at the same location, that are located in a specific geographic area, that work in the same field. As another example, the one or more other identities may be all identities for which information or at least a predetermined amount of information is available. In still another example, the one or more other identities may be a random or predetermined sample of identities for which identity information is available. In yet another example, the one or more other identities may be identities who have previously accessed the resource that the particular identity is requesting to access. In still yet another example, the one or more other identities may be identities that have accessed the same or similar resources as the particular identity. In a further example, the one or more other identities may be identities that have accessed or requested access to resources within a certain time period, at certain times, or on certain dates. A substantial number of other selection criteria also may be used to select the one or more other identities.

S107 may be a process for determining one or more communities (e.g., a determination of community process). In particular, in S107, community determination device 112 may use the identity information associated with the particular identity and the identity information associated with the one or more other identities to determine whether the particular identity is a member of a community with at least one of the other identities. The process performed by community determination device 112 in S107 is described below in more detail with reference to FIG. 4.

In many configurations, a community may be a set of at least two identities collaborating towards some specific goal, such as, for example, a project team or a group of identities working together and accessing common resources. Each identity that is part of the community (e.g., collaborating with the community) may be referred to as a member of the community. Communities may exist for a short period of time (e.g., a small team working on a development project for a few weeks) or an extended period of time (e.g., a large team working on a major product for a few years). In some configurations, communities may comprise identities from different entities or departments (e.g., a diligence team comprising identities from a law firm, an auditing or accounting firm, and the acquiring company). In certain cases, some identities may be members of more than one community. In other cases, other identities may not be members of any community or at least may not be members of any relevant or significant community.

In S109, risk analysis device 106 may perform a risk analysis process and determine a degree of risk (e.g., level of risk, riskiness) associated with the request by the particular identity to access the resource. The degree of risk may be based on a variety of information, which may comprise, for example, one or more of the identity information of the particular identity, the identity information of one or more members of the community, the request information, access information associated with the particular identity, access information associated with one or more members of the community, social information associated with the particular identity, social information associated with one or more members of the community, information about the resource, information about the device host, storing, or provisioning the resource, access information associated with the resource, an importance of the resource, a sensitivity of the resource, and other information that may affect or change the risk associated with the particular identity accessing the resource. In some configurations, the degree of risk may be associated directly with one or more or the particular identity, a community of which the particular identity is a member, the resource, and the request for the resource. The process performed by risk analysis device 106 in S109 is described below in more detail with reference to FIG. 5.

In S111, access enforcement device 108 may perform an enforcement process and determine an access policy for the particular user to access the resource. In many configurations, access enforcement device 108 may determine the access policy based on the degree of risk determined in S109. The access policy may apply to one or more of the particular identity, the community of which the particular identity is a member, a particular request by the identity to access the resource or other resources, and requests generally to access the resource. The access policy may be a policy for accessing the resource that may vary based on the degree of risk. For example, the access policy may be a policy to provide full and unrestricted access (e.g., administrator rights, editing rights, use rights, replacement rights) to the resource by the particular identity, or the access policy may be a policy to prohibit the identity from accessing the resource. In many configurations, the access policy may be selected from a spectrum or range of access rights ranging from full and unrestricted access to prohibited access (e.g., no access). In certain configurations, such a spectrum or range of access rights may comprise, for example, restricted (e.g., limited, partial) access, such as, one or more of read-only access, display-only access, feature-limited access (e.g., access to only a portion of available features), time-limited access (e.g., access for a limited period of time, access within certain time windows or at certain times or on certain dates), use-limited access (e.g., a predetermined number of accesses before access is prohibited), partial editorial access (e.g., permission to add but not delete information), and other access rights that may not provide the particular identity with full control over or use of the resource. The process performed by access enforcement device 108 in S111 is described below in more detail with reference to FIG. 6.

In some configurations, for example, access policy enforcement device 108 may generate the access policy in S111 and provide the access policy to one or more of a device that may host, serve, or store the resource and another device, and the one or more of a device that may host, server, or store the resource and the other device may enforce the access policy against the particular identity. In other configurations, for example, system 100 may generate the access policy and enforce the access policy against the particular identity. In still other configurations, for example, a plurality of devices comprising system 100 may function together to enforce the access policy against the particular identity.

Processes S103, S105, S107, and, in certain configurations, S101, may together be part of a learning component of a dynamic access control process. Further, process S109 may be part of a risk analysis component of the dynamic control process, and process S111 may be part of an enforcement component of the dynamic control process.

Figure 4:
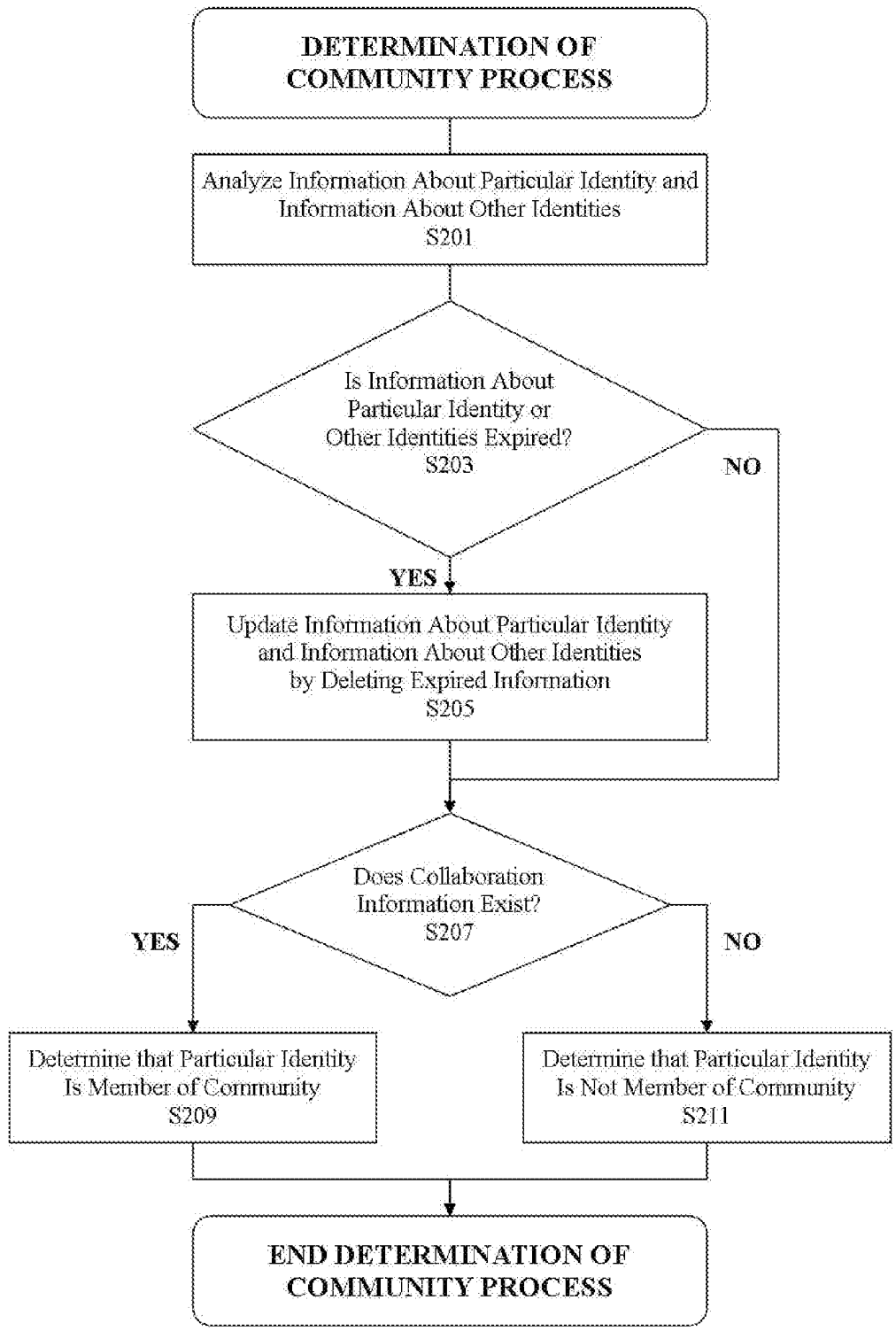
FIG. 4 illustrates a determination of community process.

Referring now to FIG. 4, a determination of community process now is described. In S201, community determination device 112 may obtain and analyze the identity information associated with the particular identity (e.g., a history of the particular identity's resource accesses, resource requests, and social interactions) and the identity information associated with the one or more other identities. In S203, CPU 102 may initiate an aging function in which expired (e.g., outdated, old) information is removed from (e.g., deleted) or updated in the various pieces of identity information. In particular, in S203, CPU 102 may determine if one or more portions of the identity information associated with the particular identity and the identity information associated with the one or more other identities is expired. Many criteria may be used to determine if any portion of such information is expired. For example, expired information may comprise one or more of information collected prior to a particular date; information collected outside of a particular window; information having a particular age; information collected during a system malfunction, corrupt information; information collected prior to certain event, such as a role or status change of one or more identity; information collected at an unusual time; information associated with certain identities; information associated with retired resources or resources that are no longer utilized; and other information that may considered old or outdated.

In certain configurations, systems and methods disclosed herein may discover and codify the level of importance (e.g., perform triage) of situational application and composite processes in enterprise or other environments. Such systems and methods may implement a narrowed statistical scan and cluster analysis, which may be based on, for example, a dedicated and proprietary DNA data structure, or, more generally, any codified data structures. In some configurations, such codified data structures may even comprise one or more of data structures created by centralized orchestration systems and data structures describing process usage. In certain configurations, systems and methods disclosed herein may, for example, operate in accordance with an assumption that a statistical behavior data structure of process activation exists, regardless of how such data structure may have been formed.

In particular configurations, the aging function performed in S203 and S207 may be eliminated or moved to another process. For example, the aging function of S203 and S207 may be performed by CPU 102 as part of or between S101, S103, and S105, or the aging function may even be performed as part of the risk analysis component of the dynamic access control process (e.g., as part of S109).

In S207, community determination device 112 may determine whether collaboration information exists. Collaboration information (e.g., collaboration data) may be information indicating a collaborative relationship between the particular identity and at least one of the one or more other identities. In many configurations, such collaboration information may be identified by analyzing the respective identity information associated with the particular identity and the one or more other identities. Collaboration information may comprise, for example, one or more of information indicating that the particular identity and at least one of the one or more other identities have accessed a same resource, have accessed a predetermined number of same resources, have accessed related resources, have accessed one or more resources at the same time, have communicated with each other (e.g., via email, via telephone, via facsimile, via messaging service, using other communication means), have indicated a collaboration with each other in a communication (e.g., indicating that the identities are involved on a team in a communication therebetween or with another identity, identifying common projects in communications), have received or are intended recipients of common communications (e.g., being on a same email list), subscribe to the same services or resources, are assigned to a same team or project, interact with each other, have similar positions, have or have had similar access rights, and have engaged in other collaborative behavior. In some configurations, S207 may require that a certain amount of collaboration information exists (e.g., information indicating a collaboration between two or more of the one or more other identities and the particular identity, information identifying more than one collaboration between the particular identity and one or more other identity, such as access to the same resources and communication therebetween). In certain configurations, S207 may require that the collaboration information is based on one or more of collaborations or interactions that have occurred with a predetermined period of time, in a particular window of time, on certain dates, after a particular date, for a certain length of time. Such a determination may be especially important if S203 and S205 are omitted in the determination of community process.

If community determination device 112 determines that collaboration information exists or, in certain configurations, that a predetermined amount of collaboration information exists, (S207: YES), community determination device 112 may determine that the particular identity is a member of a community with at least one of the one or more other identities (e.g., the particular identity and the at least one of the one or more other identities are associated with and are members of the community) in S209 and the determination of community process may end. If community determination device 112 determines that collaboration information does not exist or, in certain configurations, that a predetermined amount of collaboration information does not exist, (S207: NO), community determination device 112 may determine that the particular identity is not a member of a community with at least one of the one or more other identities in S211 and the determination of community process may end. In some configurations, the at least one of the one or more other identities may comprise a plurality of the one or more other identities. Further, in some configurations, the determination of community process may determine that the particular identity is in a plurality of different communities.

Figure 5:
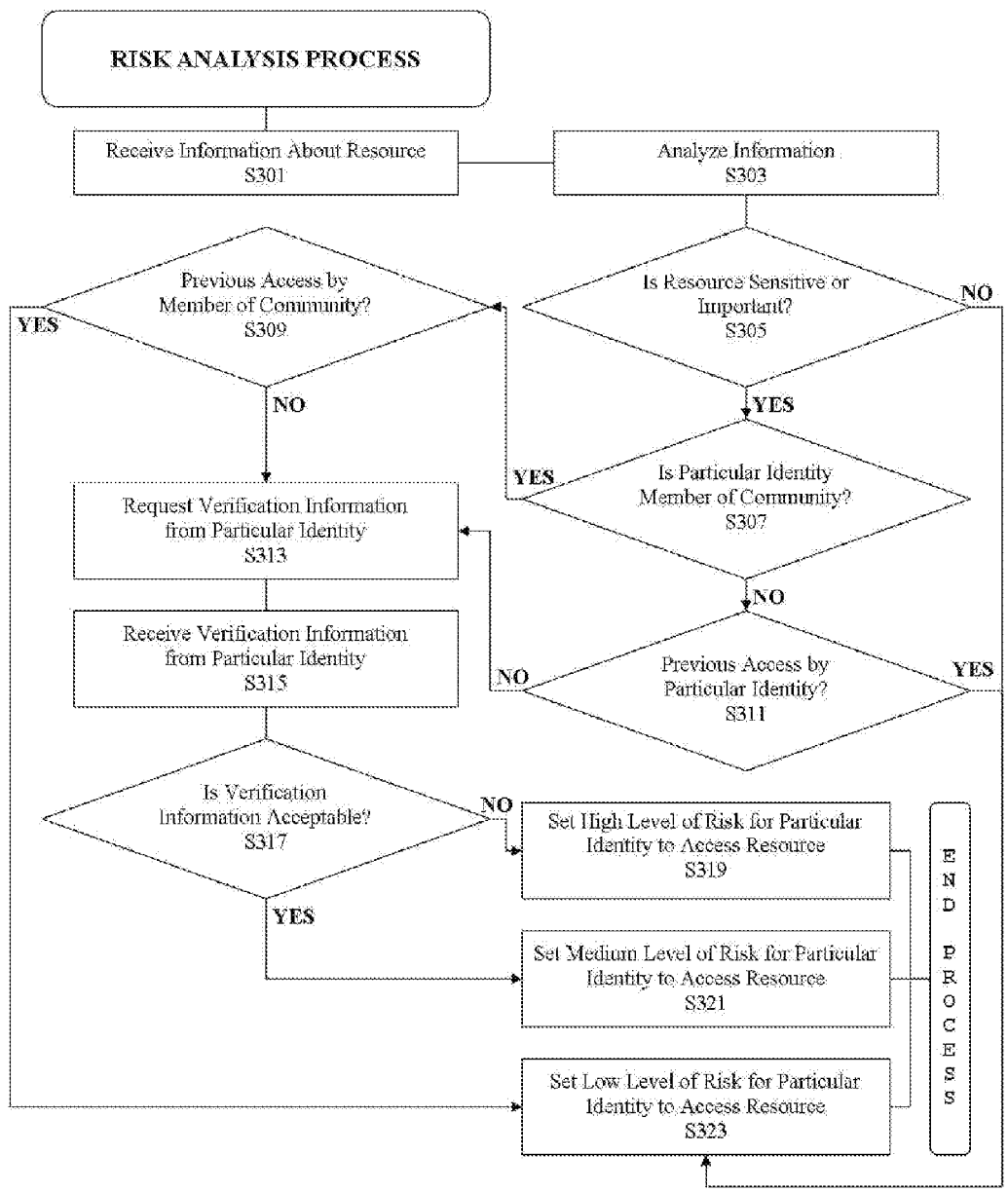
FIG. 5 illustrates a risk analysis process.

Referring now to FIG. 5, a risk analysis process now is described. In S301, risk analysis device 106 may request and receive information about the particular resource (e.g. resource information) to which the particular identity is requesting access. Risk analysis device 106 may receive such resource information from one or more of memory 101, a server 3, a device 4, or another device. S301 may be omitted in certain configurations. In some configurations, S301 may even be redundant if the resource information has already been included with other information that has already been obtained, such as, for example, one or more of identity information, access information, and request information. The resource information may comprise, for example, one or more of information about the purpose of a resource, the importance of a resource, the limits of a resource (e.g., maximum number of users), the sensitivity of a resource, the contents of the resource, and other relevant information about the resource. In S303, risk analysis device 106 may obtain and analyze a variety of information received by CPU 102 during the dynamic access control process. Such information may comprise, for example, one or more of resource information, identity information, access information, request information, social information, and other information previously received or that may be available elsewhere in network 1.

In certain configurations, in S305, risk analysis device 106 may determine, for example, whether the particular resource is sensitive or important (e.g., whether access to the resource generally should be restricted or limited in some way). If risk analysis device 106 determines that the particular resource is not sensitive or important (S305: NO), the process may proceed to S323. In S323, risk analysis device 106 may determine (e.g., set, establish) a low level of risk for the particular identity to access the particular resource. If risk analysis device 106 determines that the particular resource is sensitive or important (S305: YES), the process may proceed to S307.

In S307, risk analysis device 106 may identify a result of the determination of community process and determine if the particular identity is a member of a community. If the particular identity is not a member of a community (S307: NO), the process may proceed to S311. If the particular identity is a member of a community (S307: YES), the process may proceed to S309 (described below).

In S311, risk analysis device 106 may determine whether the particular identity has previously accessed the particular resource. In certain configurations, risk analysis device 106 may use the identity information about the particular identity to make the determination of S311. Further, in certain configurations, risk analysis device 106 may make other determinations in S311, such as, for example, one or more of whether the particular identity has accessed the resource within a particular time period, whether the particular identity has accessed the resource with a particular frequency, whether the particular identity has accessed the particular resource less than, equal to, or greater than a predetermined number of times, and whether the particular identity has accessed the resource less than, equal to, or greater than a predetermined length of time. If the particular identity has previously accessed the particular resource (or has otherwise satisfied the criteria of S311) (S311: YES), the process may proceed to S323, and risk analysis device 106 may determine (e.g., set, establish) a low level of risk for the particular identity to access the particular resource. Nevertheless, in some configurations, further verification (e.g., additional data analysis, requesting additional information from or related to the particular identity, such as a password, answers to security questions, or other information) may be required. Further, in certain configurations, a different level of risk (e.g., other than low) may be determined when a positive determination is made in S311. The different level of risk may be based on the positive determination alone or in combination with the further verification or other analysis. If the particular identity has not previously accessed the particular resource (or has not otherwise satisfied the criteria of S311) (S311: NO), the process may proceed to S313 (described below).

In S309, risk analysis device 106 may use the identity information or other information associated with members of the community (e.g., identity information associated with the particular identity and identity information associated with other members of the community) to determine whether one or more member of the community has previously accessed the particular resource. Process S309 may be substantially similar to S311, except that information associated with other members of the community in addition to that of the particular identity may be analyzed for the determination in S309. Further, in certain configurations, risk analysis device 106 may make other determinations in S311, such as, for example, one or more of whether at least one member of the community has previously accessed the particular resource, whether at least a predetermined number of members of the community have previously accessed the particular resource, whether a member of the community has accessed the resource within a particular time period, whether a member of the community or members of the community have accessed the resource with a particular frequency, whether a member of the community or members of the community have accessed the particular resource less than, equal to, or greater than a predetermined number of times, and whether a member of the community or members of the community have accessed the resource less than, equal to, or greater than a predetermined length of time. If at least one member of the community has previously accessed the particular resource (or has otherwise satisfied the criteria of S309) (S309: YES), the process may proceed to S323, and risk analysis device 106 may determine (e.g., set, establish) a low level of risk for the particular identity to access the particular resource. Nevertheless, in some configurations, further verification (e.g., additional data analysis, requesting additional information from or related to the particular identity, such as a password, answers to security questions, or other information) may be required. Further, in certain configurations, a different level of risk (e.g., other than low) may be determined when a positive determination is made in S309. The different level of risk may be based on the positive determination alone or in combination with the further verification or other analysis. If at least one member of the community has not previously accessed the particular resource (or has not otherwise satisfied the criteria of S309) (S309: NO), the process may proceed to S313.

In S313, risk analysis device 106 may request verification information (e.g., a password, a security question, an IP address, a geographic location from which the request was generated, personal information about the identity, a CAPTCHA response) from or associated with the particular identity from one or more verification sources, such as, for example, one or more of the particular identity, members of a community associated with the particular identity, memory 101, and other locations in network 1. In S315, risk analysis device 106 may receive the verification from one or more of the one or more verification source. In S317, risk analysis device 106 may determine whether the verification information is acceptable (e.g., whether the verification information is in agreement with stored or predetermined information, whether the verification information is complete, whether the verification information is accurate). If the verification information is acceptable (S317: YES), the process may proceed to S321, for example, and risk analysis device 106 may determine (e.g., set, establish) a medium level of risk for the particular identity to access the particular resource. If the verification information is not acceptable (S317: NO), the process may proceed to S319, for example, and risk analysis device 106 may determine (e.g., set, establish) a high level of risk for the particular identity to access the particular resource. Further, in certain configurations, a different level of risk may be determined based on the result of S317. The different level of risk may be based on the determination in S317, a history of past determinations in the risk analysis process (e.g., in S305, S307, S309, S311, S317) alone or in combination with other analysis or verification. In certain configurations, risk analysis device 106 may not receive the verification information. Consequently, in such configurations, risk analysis device 106 also may make a negative determination in S317.

In some configurations, a range of risk levels may be determined based on the variety of information analyzed in the risk analysis process of FIG. 5. The range of risk levels may comprise, for example, two risk levels (e.g., high, low), three risk levels (e.g., high, medium, low), or any other number of risk levels. Consequently, the risk analysis process shown in FIG. 5 is merely an example configuration and the disclosure is not limited thereto. Moreover, the determinations made in the risk analysis process shown in FIG. 5 may be performed in many different orders, and certain processes may be omitted. For example, S313, S315, and S317 may be omitted or moved, or similar processes may be added elsewhere in the risk analysis process. Subsequent to each of S319, S321, and S323, the risk analysis process may end.

Figure 6:
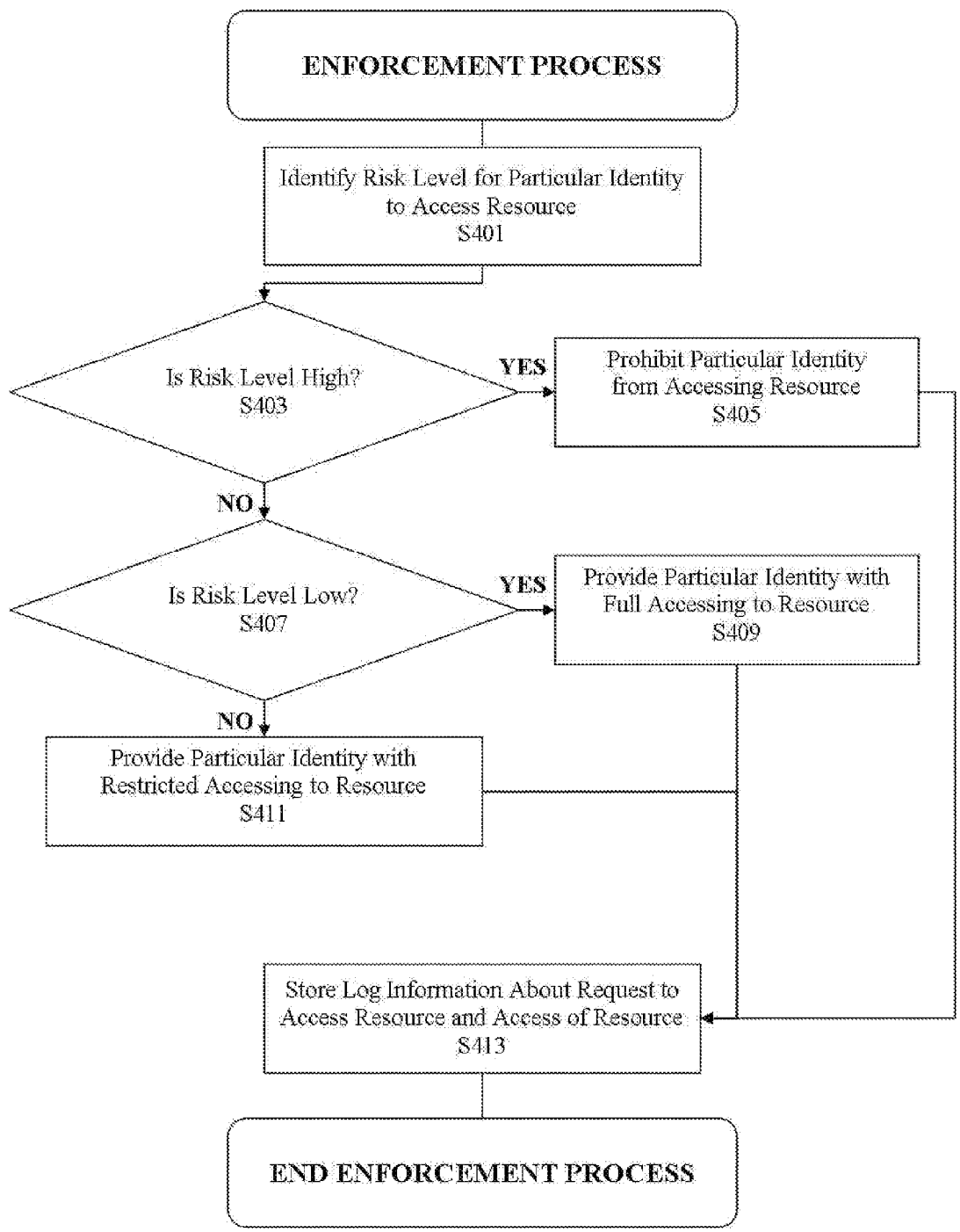
FIG. 6 illustrates an enforcement process.

Referring now to FIG. 6, an enforcement process now is described. In S401, access enforcement device 108 may identify the degree of risk for the particular identity to access the particular resource determined in the risk analysis process. In S403, access enforcement device 108 may determine whether the degree of risk is a high level of risk. If the degree of risk is a high level of risk (S403: YES), access enforcement device 108 may proceed to S405 and determine an access policy to prohibit the particular identity from accessing the particular resource. If the degree of risk is not a high level of risk (S403: NO), access enforcement device 108 may proceed to S407 and determine whether the degree of risk is a low level of risk. If the degree of risk is a low level of risk (S405: YES), access enforcement device 108 may proceed to S409 and determine an access policy to provide the particular identity with full (e.g., unrestricted, unlimited) access to the particular resource. If the degree of risk is not a low level of risk (S407: NO), access enforcement device 108 may proceed to S411 and determine an access policy to provide the particular identity with restricted (e.g., limited) access to the resource. Subsequent to each of S405, S409, and S411, the enforcement process may proceed to S413 and store log information about the request by the particular identity to access the particular resource and information about the particular identity's access of the resource (e.g., duration, time, information obtained or downloaded, services obtained). Consequently, S413 may be an audit step.

In certain configurations, access enforcement device 108 may generate the access policy for the particular identity to access the particular resource. In some configurations, access enforcement device 108 also may enforce the access policy and restrict the particular identity's access to the particular resource based on the access policy. In other configurations, access enforcement device 108 may transmit the access policy to another device (e.g., a device hosting, providing, or serving the resource, a dedicated enforcement device, a device operated by the particular identity), which may enforce the access policy against the particular identity.

In certain configurations, there may be fewer than or more than three access policies based on the number of risk levels available for determination in the risk analysis process. Consequently, in many configurations, there may be a corresponding access policy for each risk level determined in the risk analysis process. Further, the available access policies may provide a range of access rights from prohibited access (e.g., no access is permitted) to full access (e.g., unrestricted access, administrator rights, editing rights, use rights, replacement rights), with various restricted access options therebetween. Such restricted access options may comprise, but are not limited to, one or more of time-limited access, date-limited access, duration-limited access, frequency-limited access, write-limited access, read-limited access, attempt-limited access, partial access of a resource (e.g., a portion of a document may be redacted based on the risk posed by allowing the access), and other restrictions of access that may not allow full access or completely prohibit access of the particular resource.

In some configurations, the risk analysis device 106 may reevaluate the degree of risk of the particular identity accessing a resource in response to the passage of a predetermined amount of time. Such reevaluation may be beneficial if an aging function is not applied to the identity information to remove expired data. Accordingly, risk analysis device 106 may reevaluate the available information, giving less weight to older data (e.g., data of a certain age or older) and identify a new degree of risk for the particular identity to access the particular resource. Consequently, access enforcement device 108 may further update (e.g., change, alter, amend) the access policy for the particular identity to access the particular resource, such that the access policy may change. Therefore, the access policy may be changed based on an amount of time that has elapsed since a particular member of the community or, in certain configurations, the particular identity most-recently accessed the particular resource.

In some configurations, community determination device 112 may receive information (e.g., non-collaboration information) indicating that the particular identity is no longer collaborating with members of the community. Such non-collaboration information may comprise, for example, one or more of information indicating that the particular identity is no longer on a project team or in a group, no longer has a particular role, no longer works for a company, has stopped interacting with other members of the community, has stopped accessing resources similar to those accessed by other members of the community, and has otherwise ended or suspended collaboration with other members of the community. Subsequent to receiving such non-collaboration information, community determination device 112 may determine that the particular identity is no longer a member of the community, risk analysis device 106 may update or change the degree of risk associated with the particular identity or requests to access the particular resource by the particular identity, and access enforcement device 108 may update or change the access policy accordingly.

In certain configurations, the dynamic access control process may not be performed each time a particular identity requests access to a resource. In some configurations, the dynamic access control process may be performed the first time the particular identity requests access to a particular resource and the generated access policy corresponding to the particular identity and the particular resource may be stored (e.g., in memory 101 or another location in network 1) and applied until, for example, one or more of a particular event occurs, a particular period of time has elapsed, and a change has occurred in a status of the particular identity, the particular resource, or the community. In particular configurations, the dynamic access control process may be performed at random.

In some configurations, for example, CPU 102 may determine whether the resource that the identity is requesting to access is similar to another resource. For example, CPU 102 may determine that the resource is similar to the other resources if the resource and the other resource have a same or similar directory location (e.g., both in the same folder) or if the resource and the other resource have the same or similar content (e.g., both related to financial information for a particular period, both related to the same research project, both related to particular business initiatives). If CPU 102 determines that the resource is similar to the other resource, CPU 102 may use this information when determining the degree of risk associated with the request to access the resource. For example, CPU 102 may determine whether the identity or another member of the community has previously accessed the other resource. Accordingly, CPU 102 may determine that the degree of risk is lower when the identity or another member of the community has previously accessed the other resource. Moreover, for example, the degree of risk may be based on an amount of similarity between the resource and the other resource (e.g., the degree of risk when the resource is 40% similar to the other resource may be greater than the degree of risk when the resource is 70% similar to the other resource and the identity or another member of the community has previously accessed the other resource).

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:

receiving, at a receiving device, data corresponding to a request to access a resource by a particular identity provided with authority to access the resource;

determining, by a determination device, whether the particular identity is a member of a community based on associating data that associates the particular identity with the community, the community comprising a plurality of identities as members thereof that are associated based on the associating data;

determining, by an analysis device, a risk level associated with the request using a history of access of the resource by a particular member of the community that is not the particular identity requesting the data in response to determining that the particular identity is a member of the community; and determining, by an access device, an access policy based on the risk level associated with the request, the access policy indicating whether access to the resource by the particular identity is to be restricted.

2. The method of claim 1, further comprising:
determining the risk level associated with the request using a history of access of the resource by the particular identity in response to determining that the particular identity is not a member of the community.

3. The method of claim 1, further comprising:
receiving, as the associating data, collaboration data indicating a particular collaboration between the particular identity and another identity,
wherein determining whether the particular identity is a member of the community comprises determining that the particular identity is a member of the community with the other identity in response to receiving the collaboration data.

4. The method of claim 3, wherein the collaboration data comprises data indicating past interaction between the particular identity and the other identity.

5. The method of claim 3, wherein the collaboration data comprises data indicating past access of a same resource by both the particular identity and the other identity.

6. The method of claim 1, wherein determining the risk level associated with the request comprises:
determining whether the particular member of the community has previously accessed the resource in response to determining that the particular identity is a member of the community;
requesting verification data associated with the particular identity in response to determining that no members of the community have previously accessed the resource;
receiving the verification data in response to requesting the verification data; and
determining the risk level using the verification data in response to receiving the verification data.

7. The method of claim 1, further comprising:
determining an amount of time that has elapsed since a particular member of the community accessed the resource; and
determining a new risk level associated with the particular identity and the resource using the amount of time that has elapsed since the particular member of the community accessed the resource;
re-determining the access policy for access to the resource by the particular identity based on the new risk level.

8. The method of claim 1, wherein determining the risk level associated with the request comprises:
determining that the risk level is at a first level of risk in response to determining that the particular identity is a member of the community and the particular member of the community has previously accessed the resource;
determining that the risk level is at a second level of risk in response to determining that the particular identity is not a member of a community comprising a member that has previously accessed the resource and the particular identity has previously accessed the resource; and
determining that the risk level is at a third level of risk in response to determining that the particular identity is not a member of the community comprising a member that has previously accessed the resource and the particular identity has not previously accessed the resource.

9. The method of claim 1, wherein determining the access policy for the particular identity to access the resource comprises:

determining the access policy to be an access policy that permits the particular identity to access the resource with unrestricted access rights in response to determining that the risk level is at a first level of risk;
determining the access policy to be an access policy that permits the particular identity to access the resource with restricted access rights in response to determining that the risk level is at a second level of risk; and
determining the access policy to be an access policy that prohibits the particular identity from accessing the resource in response to determining that the risk level is at the third level of risk.

10. A system comprising:
a system of one or more processors, the system of one or more processors configured to:
receive data corresponding to a request to access a resource by a particular identity provided with authority to access the resource;
determine whether the particular identity is a member of a community based on associating data that associates the particular identity with the community, the community comprising a plurality of identities as members thereof that are associated based on the associating data;
determine whether any of the members of the community have previously accessed the resource in response to determining that the particular identity is a member of the community; and
establish a restricted access policy in response to determining that no members of the community have previously accessed the resource, the restricted access policy restricting access to the resource by the particular identity.

11. The system according to claim 10,
wherein the system of one or more processors is configured to determine a risk level associated with the request using a history of access of the resource by the particular identity in response to determining that the particular identity is not a member of the community.

12. The system according to claim 10,
wherein the system of one or more processors is configured to receive, as the associating data, collaboration data indicating a particular collaboration between the particular identity and another identity, and
wherein the system of one or more processors is configured to determine that the particular identity is a member of the community with the other identity in response to receiving the collaboration data.

13. The system of claim 10,
wherein the system of one or more processors is configured to determine whether the particular member of the community has a particular history of accessing the resource in response to determining that the particular identity is a member of the community,
wherein the system of one or more processors is configured to request verification data associated with the particular identity in response to determining that no members of the community have previously accessed the resource,
wherein the system of one or more processors is configured to receive the verification data in response to requesting the verification data,
wherein the system of one or more processors is configured to determine a risk level associated with the request using the verification data in response to receiving the verification data, and
wherein the restricted access policy is established based on the risk level associated with the request.

14. A non-transitory computer program product comprising:
- a non-transitory computer readable storage medium having computer readable program code embodied therewith, the computer readable program code comprising:
  - computer readable program code configured to receive data corresponding to a request to access a resource by a particular identity provided with authority to access the resource;
  - computer readable program code configured to determine whether the particular identity is a member of a community based on associating data that associates the particular identity with the community, the community comprising a plurality of identities as members thereof that are associated based on the associating data;
  - computer readable program code configured to determine a risk level associated with the request using a history of access of the resource by a particular member of the community that is not the particular identity requesting the data in response to determining that the particular identity is a member of the community; and
  - computer readable program code configured to determine an access policy based on the risk level associated with the request, the access policy indicating whether access to the resource by the particular identity is to be restricted.

15. The non-transitory computer program product of claim 14, wherein the computer readable program code embodied with the non-transitory computer readable storage medium further comprises:
- computer readable program code configured to determine the risk level associated with the request using a history of access of the resource by the particular identity in response to determining that the particular identity is not a member of the community.

16. The non-transitory computer program product of claim 14, wherein the computer readable program code embodied with the non-transitory computer readable storage medium further comprises:
- computer readable program code configured to receive, as the associating data, collaboration data indicating a particular collaboration between the particular identity and another identity,
- wherein the computer readable program code configured to determine whether the particular identity is a member of a community is configured to determine that the particular identity is a member of the community with the other identity in response to receiving the collaboration data.

17. The non-transitory computer program product of claim 16, wherein the collaboration data comprises data indicating past interaction between the particular identity and the other identity.

18. The non-transitory computer program product of claim 14,
- wherein the computer readable program code configured to determine the risk level associated with the request comprises:
  - computer readable program code configured to determine whether the particular member of the community has a particular history of accessing the resource in response to determining that the particular identity is a member of the community;
  - computer readable program code configured to request verification data associated with the particular identity in response to determining that no members of the community have previously accessed the resource;
  - computer readable program code configured to receive the verification data in response to requesting the verification data; and
  - computer readable program code configured to determine the risk level using the verification data in response to receiving the verification data.

19. The non-transitory computer program product of claim 14, wherein the computer readable program code configured to determine the access policy based on the risk level associated with the request is configured to determine the access policy for the particular identity to access the resource by selecting the access policy from a plurality of access policies, the plurality of access policies comprising:
- prohibiting the particular identity from accessing the resource;
- permitting the particular identity to access the resource with restricted access rights; and
- permitting the particular identity to access the resource with unrestricted access rights.

20. The method of claim 1, further comprising:
- receiving other data corresponding to another request to access the resource by the particular identity;
- determining an updated risk level associated with the other request using an updated history of access of the resource by the particular member of the community, the updated history of access omitting data representing access to the resource that is older than a predetermined age; and
- updating the access policy based on the updated risk level.

* * * * *